(12) United States Patent
Oda

(10) Patent No.: US 7,621,597 B2
(45) Date of Patent: Nov. 24, 2009

(54) PLASTIC HEADREST FRAME

(75) Inventor: Shigeo Oda, Hiroshima (JP)

(73) Assignee: Toyoshi Fukuda, Ann Arbor, MI (US)

( * ) Notice: Subject to any disclaimer, the term of this patent is extended or adjusted under 35 U.S.C. 154(b) by 0 days.

(21) Appl. No.: 11/901,480

(22) Filed: Sep. 18, 2007

(65) Prior Publication Data
US 2008/0083855 A1  Apr. 10, 2008

(30) Foreign Application Priority Data
Oct. 5, 2006  (JP) .............. 2006-274167

(51) Int. Cl.
*A47C 7/38* (2006.01)
(52) U.S. Cl. .................................... 297/391
(58) Field of Classification Search ............. 297/391
See application file for complete search history.

(56) References Cited
U.S. PATENT DOCUMENTS
6,068,337 A * 5/2000 De Filippo ............ 297/391

6,631,956 B2 * 10/2003 Mauro et al. ............ 297/391 X
6,793,290 B2 * 9/2004 Lomagno ................ 297/463.1

FOREIGN PATENT DOCUMENTS
| JP | 55-59949 | 4/1980 |
| JP | 59-2843 | 1/1984 |
| JP | 62-164859 | 10/1987 |
| JP | 10-262775 | 10/1998 |

* cited by examiner

*Primary Examiner*—Rodney B White
(74) *Attorney, Agent, or Firm*—Young, Basile, Hanlon & MacFarlane, P.C.

(57) ABSTRACT

A headrest frame fabricated from a plastic material and having a core material with a cross-sectional shape that provides rigidity equal to that of a headrest frame fabricated from iron. The headrest frame has at least a first elongate leg having a core material embedded within a first plastic material. The first plastic material has a substantially round cross-sectional shape in the first elongate leg. At least a portion of the core material in said first elongate leg has a substantially rectangular cross-sectional shape.

14 Claims, 9 Drawing Sheets ion costs. Furthermore, after the automobile is scrapped, the plating material on the headrest frame must be removed before the iron in the headrest frame can be recycled. This complicates the automobile disposal process and thus raises the cost of disposing of and recycling the automobile. Additionally, as the plating material may comprise elements that are potentially harmful to the environment, removal and disposal of the plating material is not favorable for the environment.

PLASTIC HEADREST FRAME

CROSS-REFERENCE TO RELATED APPLICATIONS

This application claims the benefit of Japanese Patent Application No. 2006-274167, filed Oct. 5, 2006.

FIELD OF THE INVENTION

The invention relates to the field of headrests for automobiles, and more particularly, the invention relates to a plastic headrest frame that supports a headrest with respect to a seat in an automobile.

BACKGROUND OF THE INVENTION

It is well known to support a headrest with respect to a seat in an automobile by using a frame, and such headrest frames typically provide for adjustment of the headrest with respect to the seat of the automobile. During an automotive collision, the headrest functions to stabilize the head of a vehicle occupant who is seated in the seat. Of course, if the headrest frame were to break during the automotive collision, the headrest would no longer be operative to stabilize the head of the vehicle occupant, and the protections intended to be provided to the vehicle occupant by the headrest would be lost. For this reason, headrest frames are constructed from materials that provide sufficient strength and rigidity to withstand the extreme forces exerted upon the headrest frame during an automotive collision. Thus, conventional headrest frames are made of iron and are typically either round or tubular in cross-section.

One difficulty in fabricating headrest frames from iron is that iron headrest frames must be plated, usually with zinc and chromium. The plating process makes fabrication of iron headrest frames complicated and leads to increased production costs. Furthermore, after the automobile is scrapped, the plating material on the headrest frame must be removed before the iron in the headrest frame can be recycled. This complicates the automobile disposal process and thus raises the cost of disposing of and recycling the automobile. Additionally, as the plating material may comprise elements that are potentially harmful to the environment, removal and disposal of the plating material is not favorable for the environment.

Accordingly, it would be desirable to have a headrest frame that eliminates the need for plating.

SUMMARY OF THE INVENTION

A headrest frame made of formed plastic lacks rigidity when compared with a headrest frame made of iron. Therefore, there is a concern for its inability to effectively protect the person in the car at the time of an accident, because the impact of the accident might break the headrest frame, and the headrest frame becomes unable to support the headrest properly. Thus, the invention provides an automotive headrest frame that can reduce the impact that might be applied to the person in the car at the time of an accident by devising a new shape in the cross-section of embedded core material to realize plastic rigidity that is equal to that of the iron headrest frame.

The headrest frame is adapted to support a headrest with respect to a seat, and includes a first plastic material having a substantially round cross-sectional shape and a core material embedded within the first plastic material such that the first plastic material completely covers the core material. A first elongate leg is formed from the first plastic material and the core material, and at least a portion of the core material in the first elongate leg has a substantially rectangular cross-sectional shape. A second elongate leg formed integrally with the first elongate leg from the first plastic material and the core material, and at least a portion of the core material in the second elongate leg has a substantially rectangular cross-sectional shape. A connecting bar is formed integrally with the first elongate leg and the second elongate leg from the first plastic material and the core material, wherein the connecting bar spaces the first elongate leg from the second elongate leg and the first elongate leg, the second elongate leg and the connecting bar cooperate to define a substantial u-shape. A plurality of recesses are formed in the first plastic material on the first elongate leg, and the core material has a substantially rectangular cross-section adjacent to the recesses, wherein the recesses are engageable with the seat for adjustably connecting the first elongate leg to the seat.

At least a portion of the core material may have a substantially round cross-sectional shape. Alternatively, the core material may have a substantially rectangular cross-sectional shape throughout, defined by a narrow front side of the core material spaced from a narrow rear side of the core material by a pair of wide sides of the core material, wherein the wide sides are wider than the narrow front side and the narrow rear side. Furthermore, the portions of the core material having a substantially rectangular cross-sectional shape may have a trapezoidal cross-sectional shape.

The core material may be fabricated from metal. Alternatively, the core material may be fabricated from a second plastic material having a hardness higher than the hardness of the first plastic material. Also, the core material may be solid, or the core material may be substantially tubular.

The first elongate leg and the second elongate leg may each have a lower portion and a slanting portion, such that the lower portions meet the slanting portions at an angle opposite free ends of the lower portions, and the slanting portions meet the connecting bar opposite the lower portions. Furthermore, a bar may be formed integrally with the first elongate leg and the second elongate leg and having the core material embedded within the plastic material, and the bar meets each of the first elongate leg and the second elongate leg near the intersection of the lower portion and the slanting portion of each of the first elongate leg and the second elongate leg.

BRIEF DESCRIPTION OF THE DRAWINGS

The description herein makes reference to the accompanying drawings wherein like referenced numerals refer to like parts throughout several views and wherein.

DETAILED DESCRIPTION OF THE INVENTION

Figure 1:
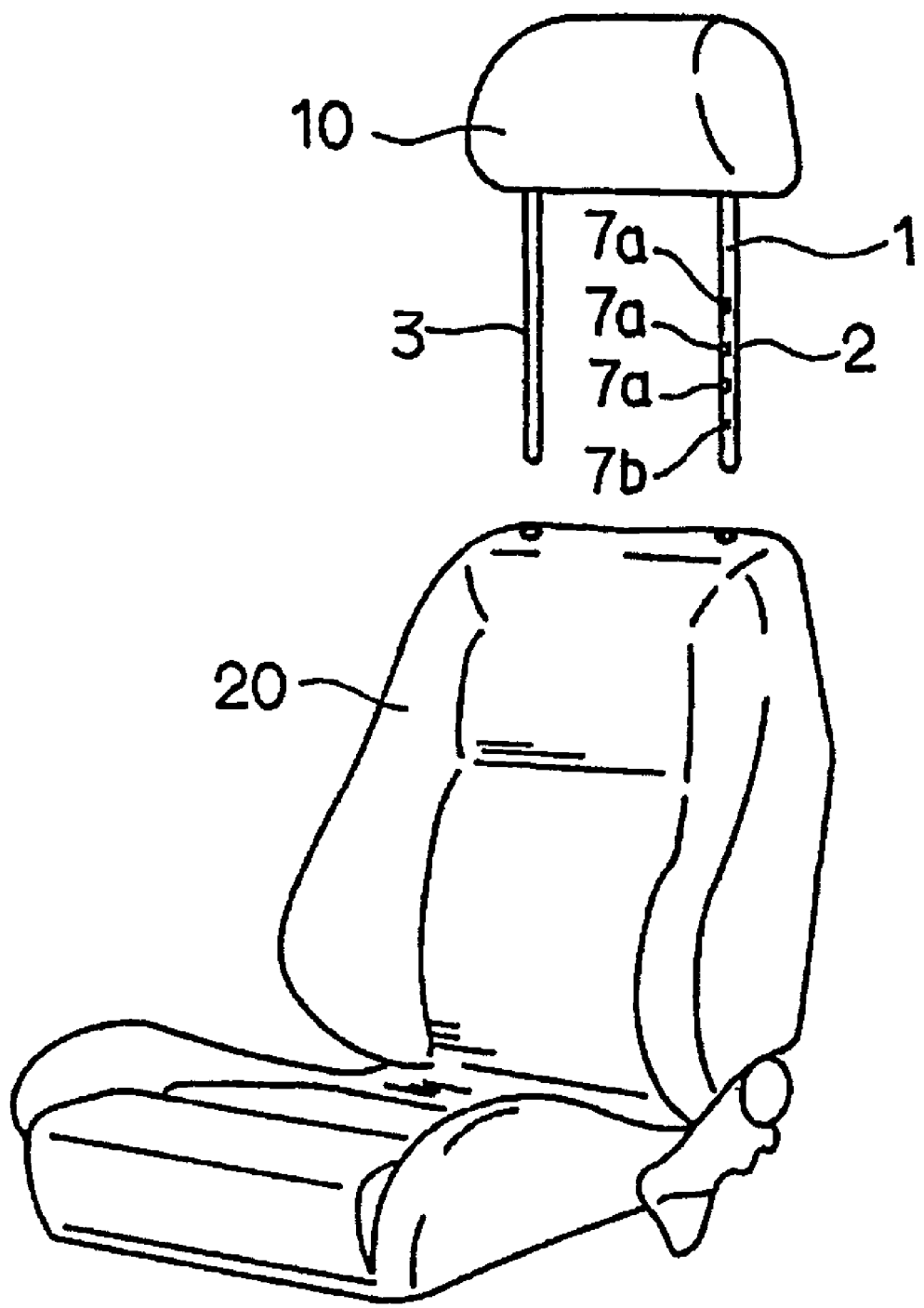
FIG. 1 is a perspective view of a headrest having a headrest frame according to a first embodiment of the invention for supporting the headrest with respect to a car seat.

Referring to the drawings, the invention will be seen to most generally comprise a headrest frame that is fabricated from a plastic material and reinforced by a one-piece core material that is embedded within the plastic material, as will now be described in detail with reference to the disclosed embodiments.

FIG. 1 shows a headrest frame 1 according to a first embodiment of the invention. A headrest 10 is disposed on the headrest frame 1, and the headrest frame 1 is adapted to be installed on a car seat 20 to support the headrest 10 with respect to the car seat 20. Together, the car seat 20, the headrest frame 1, and the headrest 10 define a seating assembly for use in an automobile (not shown) having a front end toward the normal direction of travel, a rear end opposite the normal direction of travel, and opposed sides, wherein the seating assembly faces the front end of the automobile. The headrest frame 1 has a first leg 2 and a second leg 3 that are receivable within the car seat 20 for connecting the headrest frame 1 to the car seat 20. A plurality of recesses 7a, 7b are formed on the headrest frame 1 for adjustably connecting the headrest frame 1 to the car seat 20, as will be described in detail herein.

Figure 2:
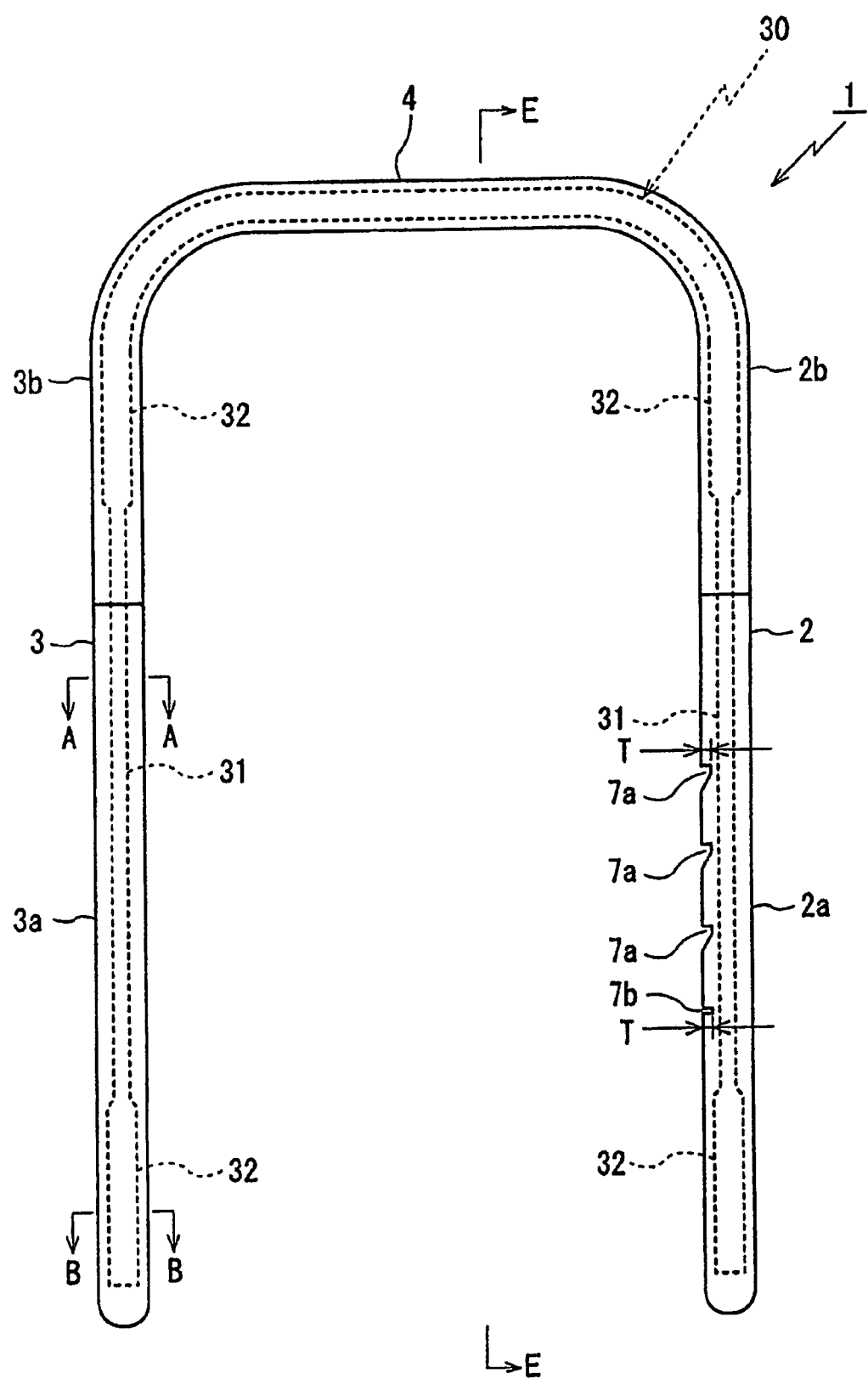
FIG. 2 is a front view of the headrest frame according to the first embodiment of the invention.
Figure 3:
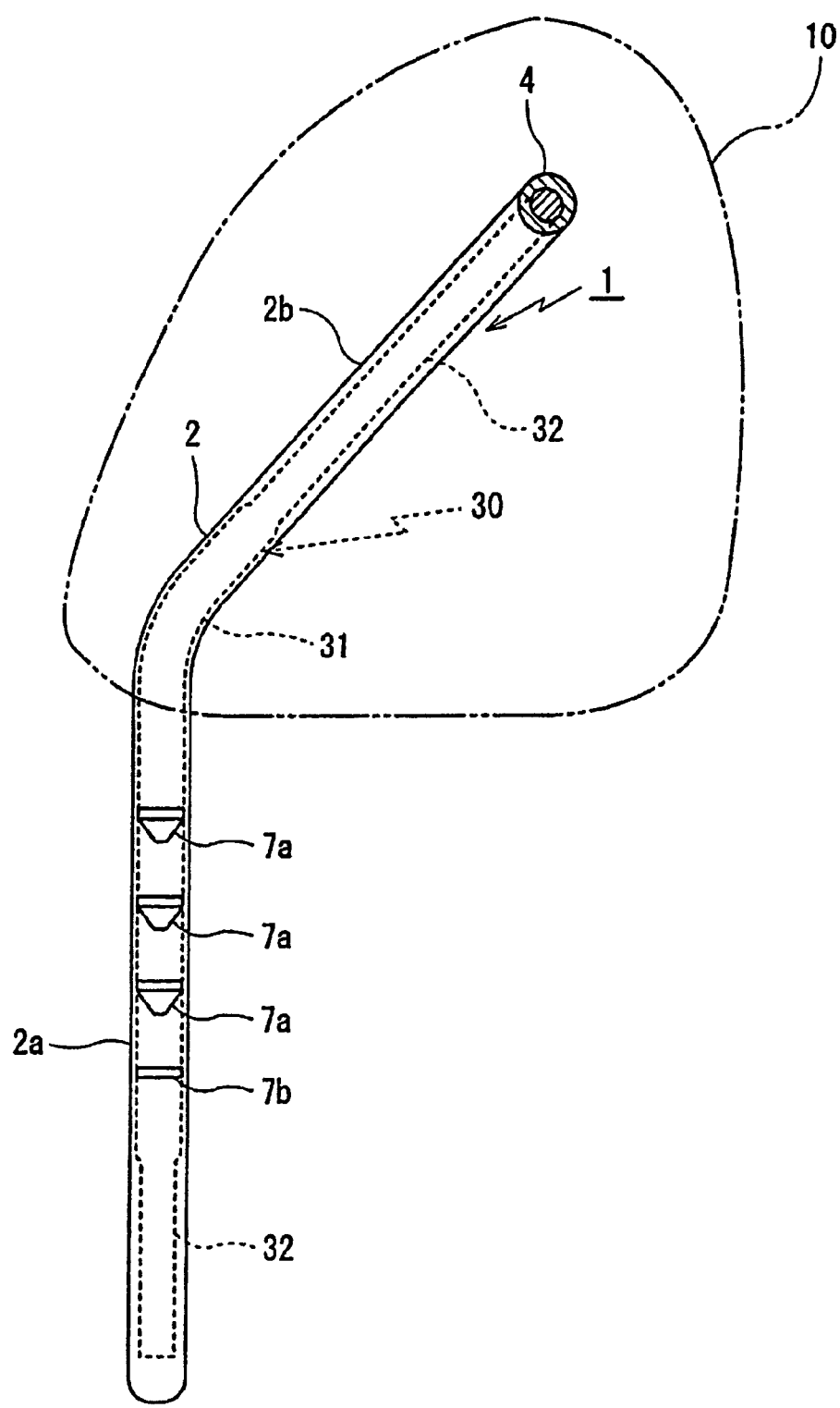
FIG. 3 is a cross section taken along line E-E of FIG. 2.

As best seen in FIG. 2, the first leg 2 and the second leg 3 of the headrest frame 1 are connected by a substantially horizontal connecting bar 4 that extends substantially perpendicular to the legs 2, 3 of the headrest frame 1, and thus, the headrest frame 1 is substantially u-shaped when viewed from the front, with the open end of the u-shape pointing downward. In cross section, the first leg 2, the second leg 3, and the connecting bar 4 are substantially round and consistent in diameter throughout the headrest frame 1, with the exception of the recesses 7a, 7b. As shown in FIG. 3, the first leg 2 and the second leg 3 of the headrest frame 1 each have a substantially vertical lower portion 2a, 3a adjacent to the free end of each of the legs 2, 3, and a slanting portion 2b, 3b adjacent to the intersection between each leg 2, 3 with the connecting bar 4. The substantially vertical lower portions 2a, 3a of the legs 2, 3 meet respective slanting portions 2b, 3b of the legs 2, 3 at obtuse angles. When the headrest 10 is installed on the headrest frame 1, the headrest 10 covers the top ends of the substantially vertical lower portions 2a, 3a of the legs 2, 3, as well as the slanting portions 2b, 3b of the legs 2, 3 and the connecting bar 4 of the headrest frame 1. Of course, the actual orientation of the substantially vertical lower portions 2a, 3a of the legs 2, 3 will vary along with the position of the car seat 20, and thus, the substantially vertical lower portions 2a, 3a need not be positioned vertically when in use, but rather, the substantially vertical lower portions 2a, 3a of the legs 2, 3 need only be substantially straight and in alignment with the connecting structure provided on the car seat 20.

The plurality of recesses 7a, 7b are formed on the inner side of the first leg 2 at an intermediate point along the substantially vertical lower portion 2a of the first leg 2. The recesses 7a, 7b are engageable with a protrusion (not shown) on the car seat 20 for adjustment of the horizontal height of the headrest 10 with respect to the car seat 20. The recesses 7a, 7b include a plurality of upper recesses 7a that are fabricated as inclined grooves or notches formed in the first leg 2, as well as a lower recess 7b that is fabricated as a substantially rectangular groove or notch. However, the form of the recesses 7a, 7b is not limited to inclined grooves or rectangular grooves, but rather, the recesses 7a, 7b may be provided in any suitable geometric shape that is engageable with the protrusion on the car seat 20 to allow adjustment of the height of the headrest 10. Also, although the recesses 7a, 7b are described herein as provided only on the first leg 2, it should be understood that the recesses 7a, 7b may be provided on either or both of the legs 2, 3.

In order to eliminate the need for plating on the exterior surfaces of the headrest frame 1, the legs 2, 3 and the connecting bar 4 of the headrest frame 1 are fabricated from a plastic material. For example, the legs 2, 3 and the connecting bar 4 of the headrest frame 1 may be formed integrally with one another from a plastic material, such as by injection molding or other suitable methods. The headrest frame 1 may be fabricated from any of a broad number of known plastic materials including, but not limited to, polyacetal, polyester, or ABS resin.

In order to enhance the strength and rigidity of the headrest frame 1, a one-piece core material 30 is embedded within the legs 2, 3 and the connecting bar 4 of the headrest frame 1. When viewed from the front, the core material 30 is substantially u-shaped, with the open end of the u-shape facing downward, as the core material 30 follows the shape of the headrest frame 1. The core material 30 is fabricated as a solid metal body, and may be fabricated from any suitable metal, such as iron or copper.

Figure 4:
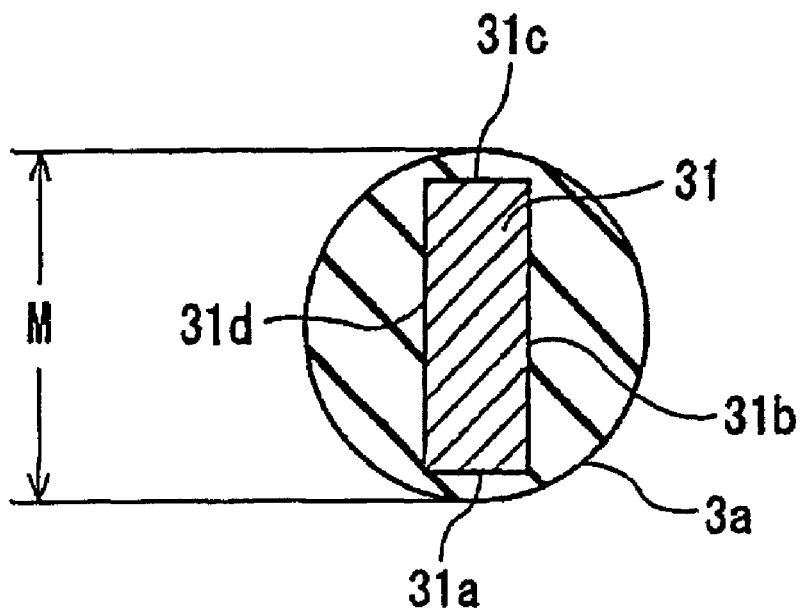
FIG. 4 is a cross section taken along line A-A of FIG. 2.
Figure 5:
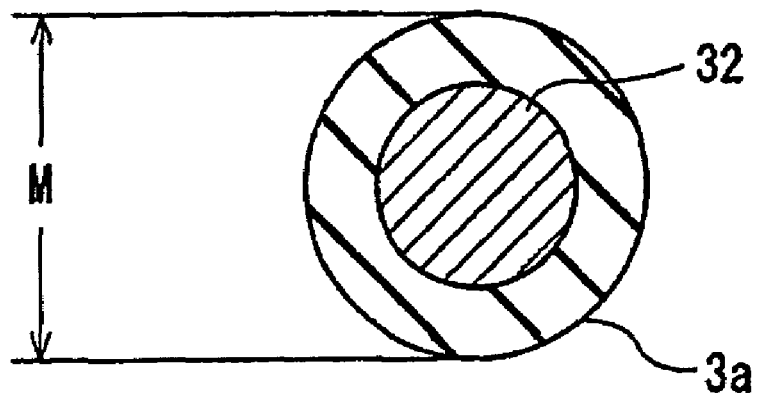
FIG. 5 is a cross section taken along line B-B of FIG. 2.

In order to strengthen the headrest frame 1 against forces that may be applied to the headrest 10 during an automotive collision, the core material 30 includes one or more rectangular cross-section portions 31 of the core material 30, while the remainder of the core material 30 is provided as a round cross-section portion 32 of the core material 30. In particular, at least one rectangular cross-section portion 31 of the core material 30 is provided in the each of the first and second legs 2, 3 of the headrest frame 1. In the rectangular cross-section portions 31 of the core material 30, as shown in FIG. 4, the core material 30 has a rectangular cross section defined by a pair of narrow sides 31a, 31c and a pair of wide sides 31b, 31d. In the round cross-section portions 32 of the core material 30, as shown in FIG. 5, the core material 30 has a round cross section. During automotive collisions, significant forces are experienced in the headrest frame 1 along the length of the automobile, that is, from the front of the automobile to the back of the automobile, or vice versa. Accordingly, in order to strengthen the headrest frame 1 against the forces that may be applied to the headrest 10 during an automotive collision, the rectangular cross-section portions 31 of the core material 30 are embedded in the headrest frame 1 in such a way that the narrow sides 31a, 31c of the rectangular cross-section portions 31 of the core material 30 are aligned to face the front and the back of the automobile, respectively, when the headrest frame 1 is installed on the car seat 20. Furthermore, since the wide sides 31b, 31d of the rectangular cross-section portions 31 of the core material 30 extend substantially perpendicular to the narrow sides 31a, 31c, one wide side 31b of each rectangular cross-section portion 31 faces the left side of the automobile while the other wide side 31d of the rectangular cross-section portion 31 of the core material 30 faces the right side of the automobile.

Although at least one rectangular cross-section portion 31 of the core material 30 is provided in the each of the first and second legs 2, 3 of the headrest frame 1, the remainder of the core material 30 may be provided as the round cross-section portion 32 of the core material 30. At the free end of the vertical lower portion 2a, 3a of each of the legs 2, 3, a round cross-section portion 32 of the core material 30 which extends from the free ends of the legs 2, 3 and terminates prior to the recesses 7a, 7b on the headrest frame 1. At that point, the rectangular cross-section portion 31 of the core material 30 begins, and extends past the recesses 7a, 7b, and may extend into the slanting portions 2b, 3b of the legs 2, 3 of the headrest frame 1. At this upper terminus of the rectangular cross-section portion 31 of the core material 30, the round cross-section portion 32 resumes on each leg 2, 3 and continues across the entire length of the connecting bar 4.

The plastic headrest frame 10 may be fabricated by first forming the core material 30 by bending a round bar of metal to form a substantial u-shape that matches the final shape intended for the headrest frame 1. In particular, as shown in FIG. 2, the core material 30 is bent at two locations at the top to form a roughly inverted U shape, which provides the two legs 2, 3 and the connecting bar 4. Then, as shown in FIG. 3, to make the top of the headrest frame tilt toward the front of the car, the legs 2, 3 are bent, thus forming the vertical lower portions 2a, 3a of the legs 2, 3 below the bending point and the slanting portions 2b, 3b of the legs 2, 3 tilting toward the front of the car above the bending point.

In order to form the square cross-section portions 31 of the core material 30, the core material 30 is flattened using a press from a point below the recesses 7a, 7b on the vertical lower portions 2a, 3a on the legs 2, 3 to an intermediate point on the slanting portions 2b, 3b on the legs 2, 3. The direction of press is parallel to the connecting bar 4. By pressing the core material 30 in this direction, the narrow side 31a and the narrow side 31c are oriented toward the front and rear of the car, respectively, when installed. For example, if a seven mm straight round bar is pressed partially, the narrow sides 31a, 31c are 3.84 mm in width, and the wide sides 31b, 31d are 10 mm in width. Of course, since this method contemplates a round bar of metal as a starting material, all of the portions of the core material 30 that are not pressed to form the rectangular cross-section portions 31 of the core material 30 will thus form round cross-section portions 32 of the core material 30.

After core material 30 has been pressed, the core material 30 is placed in a die (not shown) and the legs 2, 3 and the connecting bar 4 of the headrest 1 are formed by plastic injection molding so that plastic material completely covers the core material 30 to form the finished headrest frame 1. The plastic material of the legs 2, 3 and the connecting bar 4 covers the core material 30 in such a way that the diameter M of the headrest frame is 12 mm. The recesses 7a, 7b are formed during the plastic injection molding step at pre-determined locations provided on the die. The depth T of the recesses 7a, 7b is 2 mm.

When installed on the car seat 20, the narrow side 31a and the narrow side 31c of the rectangular cross-section portion 31 of the core material 30 face the front and the back of the car, respectively.

As described above, the step of pressing the core material was performed after the step of bending the core material. However, it should be understood that the bending step can be performed after the pressing step.

Figure 6:
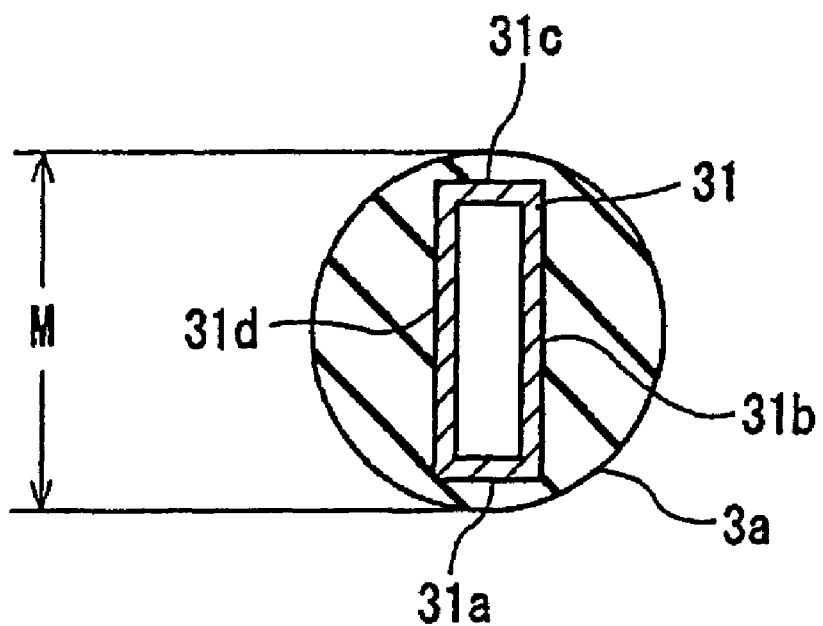
FIG. 6 is an alternative cross section taken along line A-A of FIG. 2.
Figure 7:
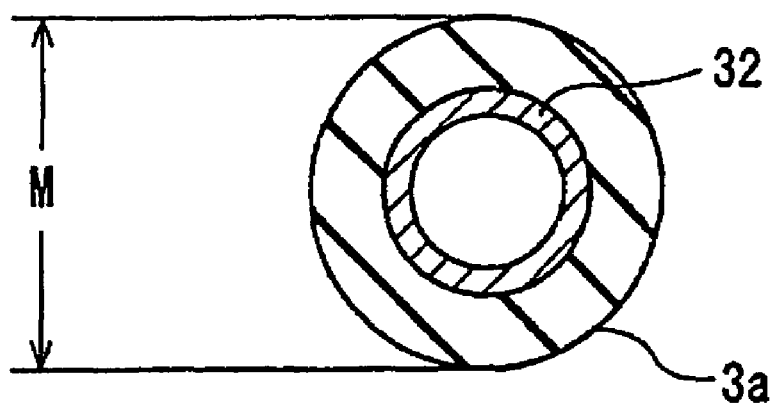
FIG. 7 is an alternative cross section taken along line B-B of FIG. 2.

In the foregoing description of the first embodiment of the invention, the core material 30 is shown and described as being solid. It should be appreciated, however, that a tubular cross-section could be provided for the core material 30. For example, as shown in FIG. 6, a tubular cross-section may be provided for the rectangular cross-section portion 31 of the core material 30. As another example, as shown in FIG. 7, a tubular cross-section may also be provided for the round cross-section portion 32 of the core material 30.

Figure 8:
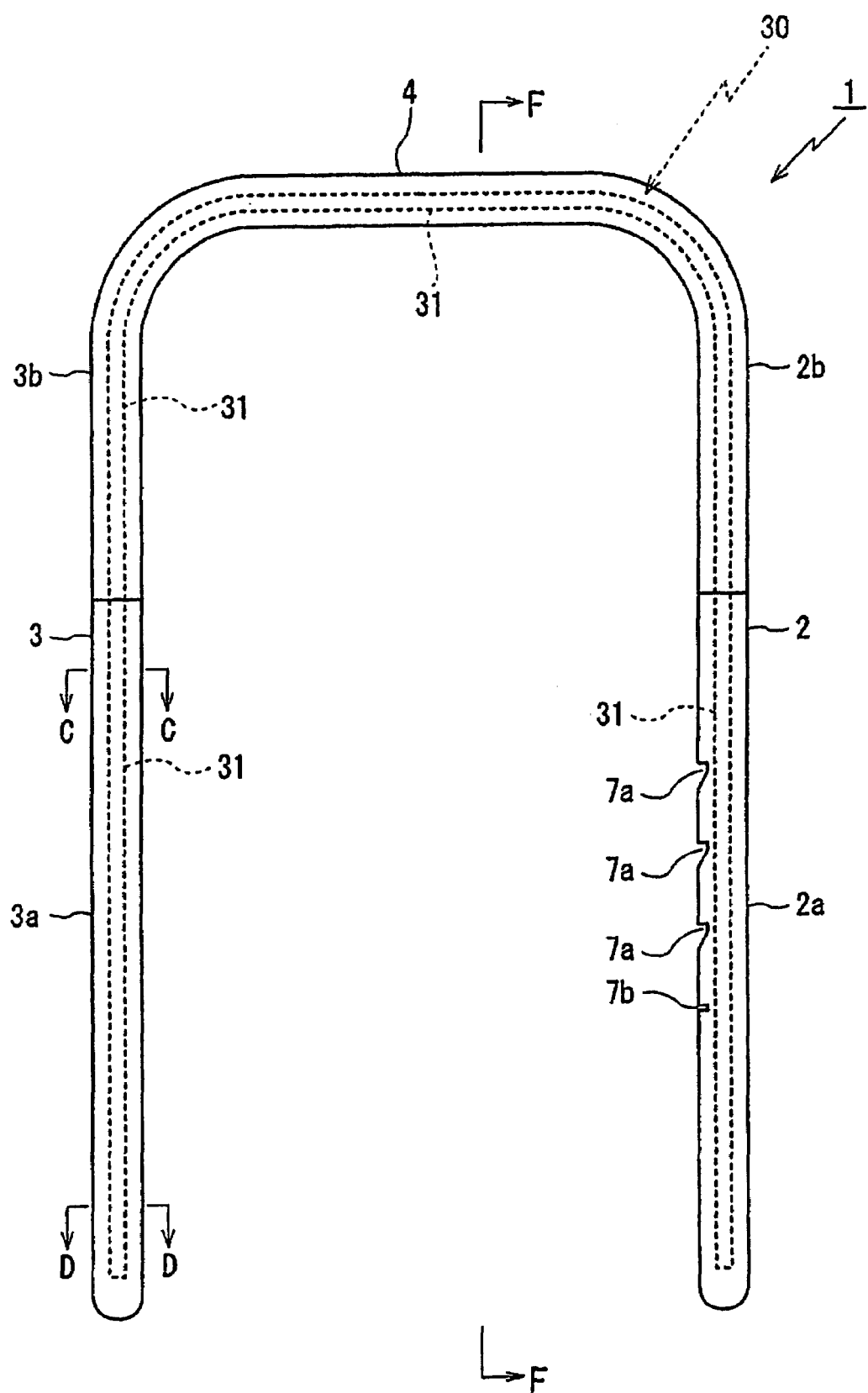
FIG. 8 is a front view of a headrest frame of a second embodiment of the invention.
Figure 9:
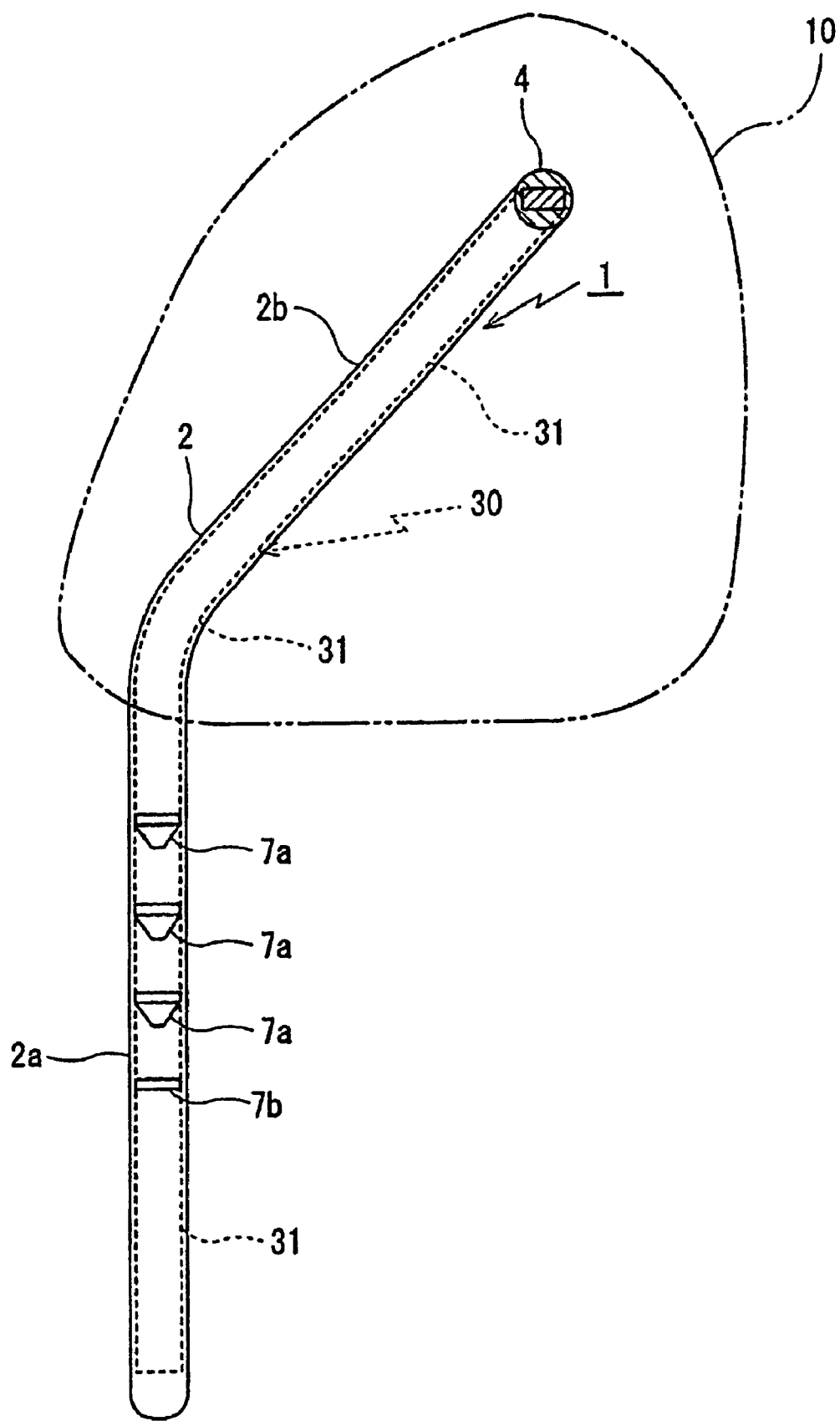
FIG. 9 is a cross section taken along line F-F of FIG. 8.

In the second embodiment of the invention, as shown in FIGS. 8-9, the plastic headrest frame 10 may be provided wherein the rectangular cross-section portion 31 of the core material 30 extends the entire length of the core material 30 to provide a rectangular cross-section throughout the core material 30. Thus, the plastic headrest frame 1 according to the second embodiment has a single-piece core material 30 embedded throughout the two legs 2, 3 and throughout the connecting bar 4 that connects the first and second legs 2, 3. The rectangular cross-section portion 31 of the core material 30 is aligned such that the narrow sides 31a and 31c face the front and the back of the car when the headrest flame 1 is installed on the car seat 20. Accordingly, the C-C line enlarged cross section and D-D line enlarged cross section in FIG. 8 both correspond to the cross section shown in FIG. 4. Furthermore, as explained with regard to the first embodiment, the rectangular cross-section portion 31 of the core material 30 may be solid, as shown in FIG. 4, or tubular, as shown in FIG. 6.

Since the core material 30 is provided only as the rectangular cross-section portion 31, the manufacturing process of the headrest frame 1 is further simplified. Also, since the narrow sides 31a and 31c of the rectangular cross-section portion 31 are aligned to face the front and the back of the car when installed on the car seat 20, the rigidity of the headrest frame 1 is sufficiently increased against the stress applied to the headrest frame 1 during a crash.

In both the first embodiment and the second embodiment, the core material 30 is described as being fabricated from metal; however, it should be understood that the core material 30 may be fabricated from a sturdy plastic material that is harder than the plastic material used for the legs 2, 3, and the connecting bar 4.

Figure 10:
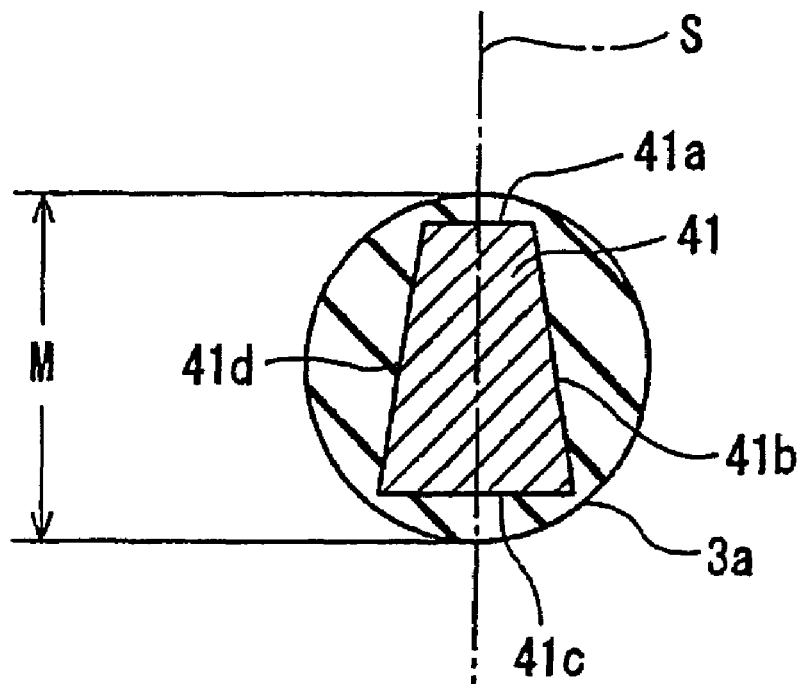
FIG. 10 is an alternative cross section taken along line A-A of FIG. 2.
Figure 11:
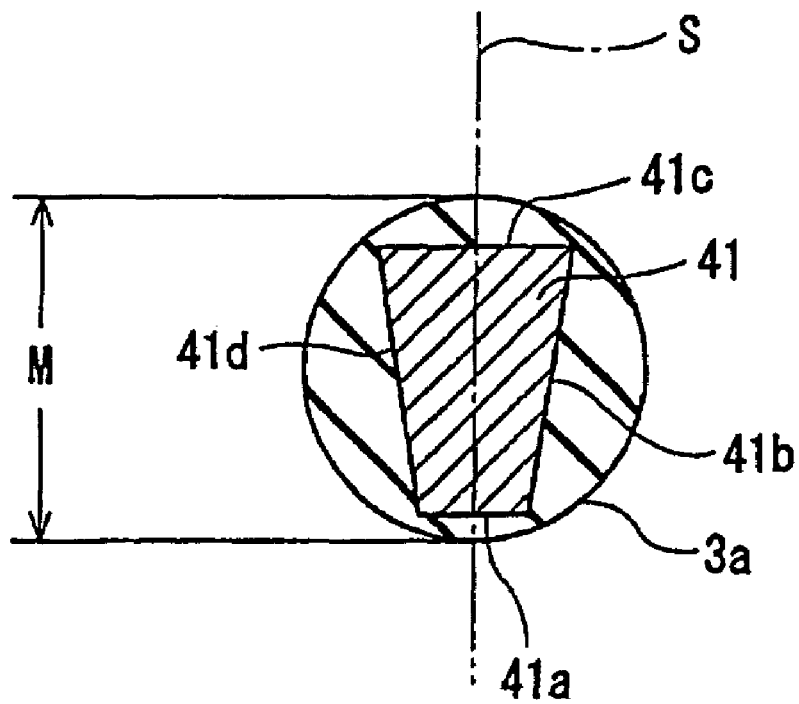
FIG. 11 is an alternative cross section taken along line A-A of FIG. 2.
Figure 12:
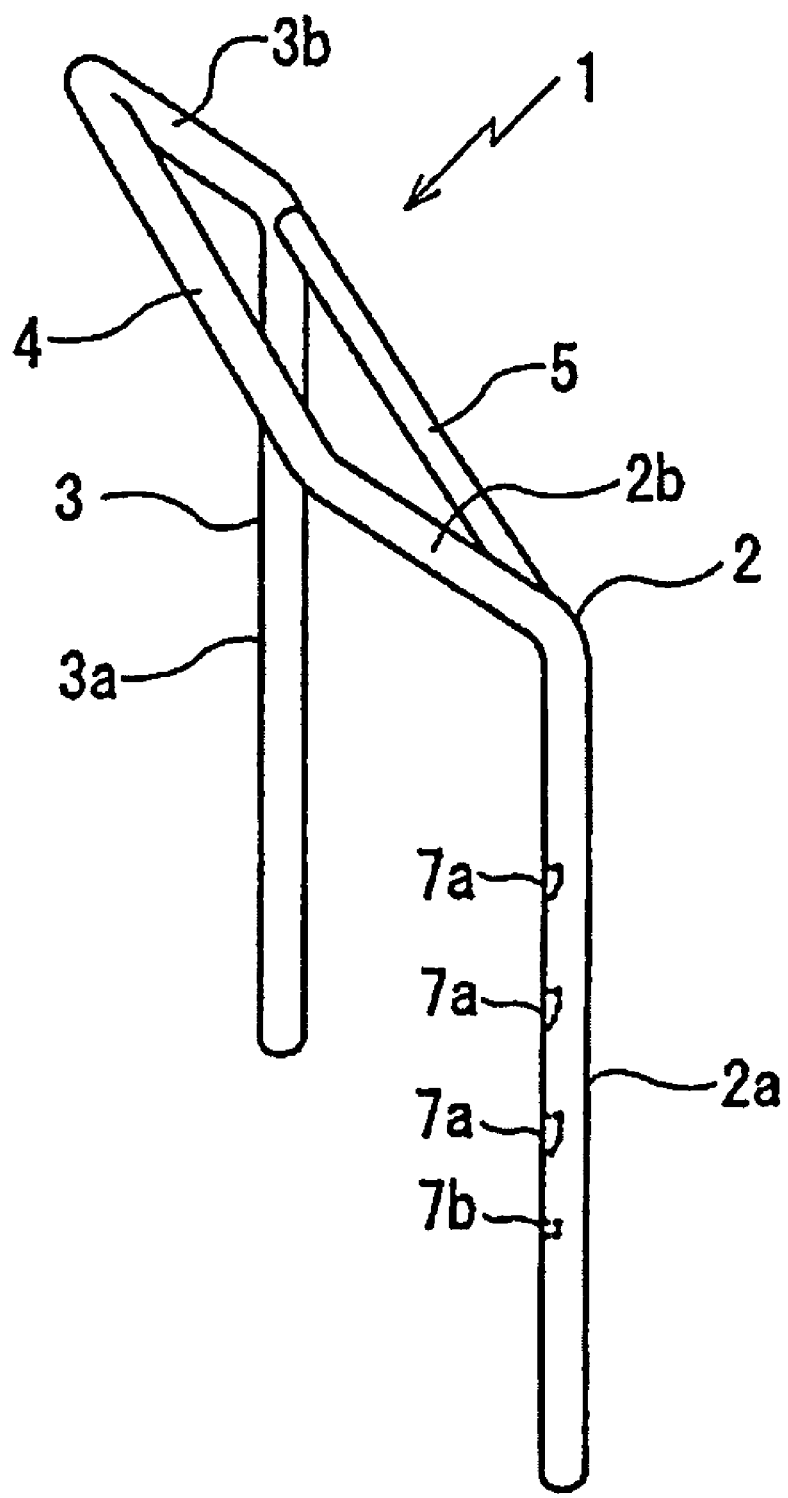
FIG. 12 is a perspective view of a headrest frame according to a third embodiment of the invention.

As previously described with respect to the first and second embodiments, the rectangular cross-section portions 31 of the core material 30 has a rectangular cross section. However, as shown in FIGS. 10-11, the rectangular cross-section portions 31 of the core material 30 need not be perfectly rectangular in cross section, but rather, could be substantially trapezoidal, wherein the trapezoidal shape of the rectangular cross-section portions 31 are symmetrical with respect to the center line S. In such a case, FIGS. 10-11 correspond to the A-A line enlarged cross section of FIG. 2, and the center line S extends substantially perpendicular to the connecting bar 4. In particular, FIG. 10 shows a cross section having narrow sides 41a, 41a and wide sides 41b, 41d, wherein the narrow side 41a faces toward the rear of the car. As an alternative, as shown in FIG. 11, the narrow side 41a may face toward the front of the car.

As a further alternative in either the first or second embodiment, rigidity of the headrest frame may be improved by providing a horizontal bar 5. The horizontal bar 5 interconnects the legs 2, 3 near the intersection of the vertical lower portions 2a, 3a and the slanting portions 2b, 3b of the legs 2, 3.

From the foregoing embodiments, it will be appreciated that by providing the headrest frame 1 of the invention with the one-piece core material 30 embedded throughout the two legs 2, 3 and the connecting bar 4, and by providing at least a portion of the core material 30 with a rectangular cross-section portion 31 in each of the legs 2, 3, wherein the rectangular cross-section portion 31 is aligned with the narrow sides 31a, 31c thereof aligned to face the front and the back of the car when installed on the car seat 20, the rigidity of the headrest frame 1 can be sufficiently increased against the stress applied to the headrest frame 1 during a crash. Therefore, even though the headrest frame 1 of the invention is fabricated from a plastic material, it can sturdily support the headrest 10.

It will be further appreciated from the foregoing that since the exterior surfaces of the headrest frame are plastic, the need for plating is eliminated, thereby simplifying the manufacturing process and reducing manufacturing costs. Furthermore, during disposal of the automobile, there is no need to remove plating material from the headrest frame, thus reducing the cost of recycling the headrest frame 1 and avoiding environmental contamination.

In the first embodiment, the rectangular cross-section portion 31 of the core material 30 is formed from a round bar by a pressing process, so its manufacturing process is simple. According to the second embodiment, the manufacturing process of the headrest frame 1 may be further simplified by forming the core material 30 from a rectangular bar to provide the rectangular cross-section portion 31 throughout the core material 30, thereby omitting the pressing process.

Also, by forming the recesses 7a, 7b on the legs 2, 3 adjacent to the rectangular cross-section portion 31 of the core material 30, the depth T of the recesses 7a, 7b may be increased as compared to the depth that would be possible if the round cross-section portion 32 of the core material 30 were provided adjacent to the recesses 7a, 7b. In this manner, the headrest frame 1 is not weakened in those areas where the recesses 7a, 7b are provided, regardless of the fact that the legs 2, 3 of the headrest frame 1 are fabricated from plastic.

Also, in either of the first or second embodiments, the core material 30 can be either solid or hollow. If the core material 30 is fabricated as a solid bar, the strength of the headrest frame 1 may be increased.

Furthermore, since the core material 30 may be fabricated from a plastic material that has a higher hardness than the plastic material from which the legs 2, 3 and the connecting bar 4 are fabricated, the manufacturing process may be further simplified, because both the core material 30 and the legs 2, 3 and the connecting bar 4 of the headrest frame 1 itself are all fabricated from plastic materials.

It has also been taught therein that by providing a horizontal bar 5 that connects the two legs 2, 3 at or near the point where the vertical lower portions 2a, 3a of the legs 2, 3 and the slanting portions 2b, 3b of the legs 2, 3 meet so that the rigidity of the headrest frame can be improved in this area.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A headrest frame for supporting a headrest with respect to a seat, comprising:
   a first plastic material having a substantially round cross-sectional shape;
   a one-piece core material embedded within said first plastic material such that said first plastic material completely covers said one-piece core material, and said one-piece core material having at least a first rectangular cross-section portion having a substantially rectangular cross-sectional shape, a second rectangular cross-section portion having a substantially rectangular cross-sectional shape, and a round cross-section portion having a substantially round cross-sectional shape, wherein said first rectangular cross-section portion and said second rectangular cross-section portion are located at opposite ends of said round cross-section portion;
   a first elongate leg, a second elongate leg, and a connecting bar formed integrally with one another from said first plastic material and said one-piece core material, wherein said connecting bar spaces said first elongate leg from said second elongate leg and said first elongate leg, and said second elongate leg and said connecting bar cooperate to define a substantial u-shape;
   said first leg and said second leg each having a lower portion and a slanting portion, said lower portions meet said slanting portions at an angled intersection opposite free ends of said lower portions, and said slanting portions meet said connecting bar opposite said lower portions;
   said first rectangular cross-section portion disposed in said lower portion of said first leg and extending through said angled intersection of said first leg into said slanting portion of said first leg;
   said second rectangular cross-section portion disposed in said lower portion of said second leg and extending through said angled intersection of said second leg into said slanting portion of said second leg; and
   said round cross-section portion disposed in said slanting portion of said first leg and extending through said connecting bar to said slanting portion of said second leg.

2. The headrest frame stated in claim 1, further comprising:
   a plurality of recesses formed in said first plastic material on said first elongate leg, wherein said first rectangular cross-section portion of said one-piece core material is disposed adjacent to said recesses and said recesses are engageable with the seat for adjustably connecting said first elongate leg to the seat.

3. The headrest frame stated in claim 1, wherein said first rectangular cross-section portion and said second rectangular cross-section portion of said one-piece core material are defined by a narrow front side of said one-piece core material spaced from a narrow rear side of said one-piece core material by a pair of wide sides of said one-piece core material, wherein said wide sides are wider than said narrow front side and said narrow rear side and said narrow front side and said narrow rear side are adapted to face frontward and rearward directions with respect to the headrest.

4. The headrest frame stated in claim 1, wherein said one-piece core material is fabricated from metal.

5. The headrest frame stated in claim 1, wherein said one-piece core material is fabricated from a second plastic material having a hardness higher than the hardness of said first plastic material.

6. A seating assembly, comprising:
   a head rest;
   a seat; and
   a headrest frame, including:
     a first plastic material having a substantially round cross-sectional shape,
     a one-piece core material embedded within said first plastic material such that said first plastic material completely covers said one-piece core material, and said one-piece core material having at least a first rectangular cross-section portion having a substantially rectangular cross-sectional shape, a second rectangular cross-section portion having a substantially rectangular cross-sectional shape, and a round cross-section portion having a substantially round cross-sectional shape, wherein said first rectangular cross-section portion and said second rectangular cross-section portion are located at opposite ends of said round cross-section portion, a first elongate leg, a second elongate leg, and a connecting bar formed integrally with one another from said first plastic material and said one-piece core material, wherein said connecting bar spaces said first elongate leg from said second elongate leg and said first elongate leg, and said second elongate leg and said connecting bar cooperate to define a substantial u-shape, said first leg and said second leg each having a lower portion and a slanting portion, said lower portions meet said slanting portions at an angled intersection opposite free ends of said lower portions, and said slanting portions meet said connecting bar opposite said lower portions, said first rectangular cross-section portion disposed in said lower portion of said first leg and extending through said angled intersection of said first leg into said slanting portion of said first leg, said second rectangular cross-section portion disposed in said lower portion of said second leg and extending through said angled intersection of said second leg into said slanting portion of said second leg, and said round cross-section portion disposed in said slanting portion of said first leg and extending through said connecting bar to said slanting portion of said second leg, and a plurality of recesses formed in said first plastic material on said first elongate leg, wherein said first rectangular cross-section portion of said one-piece core material is disposed adjacent to said recesses and said recesses are engageable with the seat for adjustably connecting said first elongate leg to the seat, wherein said headrest frame is connected to said headrest and said seat such that said first rectangular cross-section portion is disposed at least partially within said seat and at least partially within said headrest and said second rectangular cross-section portion is disposed at least partially within said seat and at least partially within said headrest so that the first and second rectangular cross-section portions span an interface between said headrest and said seat and said round cross-section portion is disposed entirely within said headrest.

7. The headrest frame stated in claim 6, wherein said first rectangular cross-section portion and said second rectangular cross-section portion of said one-piece core material are defined by a narrow front side of said one-piece core material spaced from a narrow rear side of said one-piece core material by a pair of wide sides of said one-piece core material, wherein said wide sides are wider than said narrow front side and said narrow rear side and said narrow front side and said narrow rear side are adapted to face frontward and rearward directions with respect to the headrest.

8. The headrest frame stated in claim 6, wherein said one-piece core material is fabricated from metal.

9. The headrest frame stated in claim 6, wherein said one-piece core material is fabricated from a second plastic material having a hardness higher than the hardness of said first plastic material.

10. The headrest frame stated in claim 6, wherein said one-piece core material is solid.

11. The headrest frame stated in claim 6, wherein said one-piece core material is hollow and substantially tubular.

12. The headrest frame stated in claim 6, wherein said first and second rectangular cross-section portions of said one-piece core material have a trapezoidal cross-sectional shape.

13. The headrest frame stated in claim 6, further comprising:

a bar formed integrally with said first elongate leg and said second elongate leg and having said one-piece core material embedded within said plastic material, and said bar meets each of said first leg and said second leg near said angled intersection of each of said first leg and said second leg.

14. A method for fabricating a headrest frame, comprising:

forming a substantially u-shaped one-piece core material wherein at least a portion of the one-piece core material has a substantially rectangular cross-sectional shape;

providing a metal bar having a substantially round cross-sectional shape throughout;

bending the metal bar into a substantial u-shape defining a first elongate leg, a second elongate leg and a connecting bar;

pressing the metal bar to form a first rectangular cross-section portion on the first elongate leg and a second rectangular cross-section portion on the second elongate leg while retaining the substantially round cross sectional shape of the bar in a round cross-section portion that extends from the first elongate leg through the connecting bar to the second elongate leg such that the metal bar defines a one-piece core material;

molding a plastic material around said one-piece core material, wherein said plastic material has a substantially round cross-sectional shape and said one-piece core material is completely embedded within said plastic material; and forming a plurality of recesses on said plastic material.

* * * * *